United States Patent
Theobald et al.

(10) Patent No.: US 8,719,242 B2
(45) Date of Patent: May 6, 2014

(54) SYSTEM AND METHOD FOR A DATABASE ACCESS STATEMENT INTERCEPTOR

(75) Inventors: Dietmar Theobald, Karlsruhe (DE); Christian Fecht, Walldorf (DE); Ralf Kuersch, Sandhausen (DE); Andrea Neufeld, Limburgerhof (DE); Juergen G. Kissner, Bad Schoenborn (DE); Dirk Debertin, Karlsruhe (DE); Rainer Schweigkoffer, Mannheim (DE)

(73) Assignee: SAP AG, Walldorf (DE)

( * ) Notice: Subject to any disclaimer, the term of this patent is extended or adjusted under 35 U.S.C. 154(b) by 2558 days.

(21) Appl. No.: 10/651,930

(22) Filed: Aug. 29, 2003

(65) Prior Publication Data
US 2005/0050039 A1 Mar. 3, 2005

(51) Int. Cl.
*G06F 17/30* (2006.01)

(52) U.S. Cl.
USPC .......................................... 707/705; 707/721

(58) Field of Classification Search
USPC .................................................. 707/705, 721
See application file for complete search history.

(56) References Cited

U.S. PATENT DOCUMENTS

| 5,987,245 | A  | * | 11/1999 | Gish ............................. 719/310 |
| 6,021,469 | A  | * | 2/2000  | Tremblay et al. ............. 711/125 |
| 2002/0091702 | A1 | * | 7/2002  | Mullins ......................... 707/100 |
| 2003/0135509 | A1 | * | 7/2003  | Davis et al. ................... 707/100 |
| 2003/0154239 | A1 | * | 8/2003  | Davis et al. ................... 709/201 |

* cited by examiner

*Primary Examiner* — Kim Nguyen
(74) *Attorney, Agent, or Firm* — Schwegman, Lundberg & Woessner, P.A.

(57) ABSTRACT

A database access interceptor includes a statement pool and a table buffer. The statement pool and the table buffer are associated with physical database connections. The interceptor may include a separate instance of the statement pool for each physical database connection. Similarly the interceptor may include a separate instance of the table buffer for each physical database connection.

13 Claims, 11 Drawing Sheets

SYSTEM AND METHOD FOR A DATABASE ACCESS STATEMENT INTERCEPTOR

TECHNICAL FIELD

Embodiments of the invention generally relate to the field of database access and, more particularly, to a system and method for a database access statement interceptor.

BACKGROUND

Conventional client/server systems may include a client, an application server, and a database system. The client triggers an action in the application server such that the application server sends a database access statement to the database over a previously established connection to the database system. Typically, the application server is connected to the database system over a network (e.g., a Local Area Network (LAN)). Generally, only a limited number of connections are possible between the application server and the database system. Also, the network connecting the application server to the database system may perform poorly if a large number of database access statements are communicated over the network.

In most cases, the database system must compile the received database access statement before it can provide the requested data. The processing resources that a database system devotes to compiling received database access statements detracts from the resources available to provide data to other applications. This problem may be compounded in cases where the client submits the same database access statement many times with different values. For example, the client may repeatedly provide a database access statement containing a product identifier and request information pertaining to the identified product.

Traditional client/server systems are implemented with a single stack of technology from the physical layer to the application layer. In traditional single stack client/server systems a single data source (e.g., a database system) provides the data for all clients interacting with the application servers. A model in which different parts of the technology stack are implemented by different vendors is replacing the traditional single stack model. In multi-vendor implementations of client/server systems, it is much more likely that an application server will be connected to multiple data sources implemented by a variety of vendors.

SUMMARY OF THE INVENTION

A system and method for a database access statement interceptor are described. Embodiments of the invention receive a database access statement issued by an application. In an embodiment, the received database access statement is a call to prepare another database access statement. In an embodiment, a statement pool is searched for a matching prepared database access statement associated, for example, with a particular physical connection to a data source. In an embodiment, one of a plurality of table buffers is selected to provide the requested data. The selected table buffer may be associated with a particular one of a plurality of data sources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to an interceptor that receives or intercepts database access statements from a client before they are compiled by a database system. The interceptor may include a statement pool to cache previously compiled or "prepared" database access statements. The statement pool is created for each data source when a first connection is established with the data source, in an embodiment of the invention. The term data source broadly refers to a portion(s) of a computing system in which data originates or resides. Data sources include a wide variety of databases and similar sources of data. The interceptor may also include one or more table buffers to cache previously requested data. In an embodiment, a separate instance of a table buffer exists for each data source.

Figure 1:
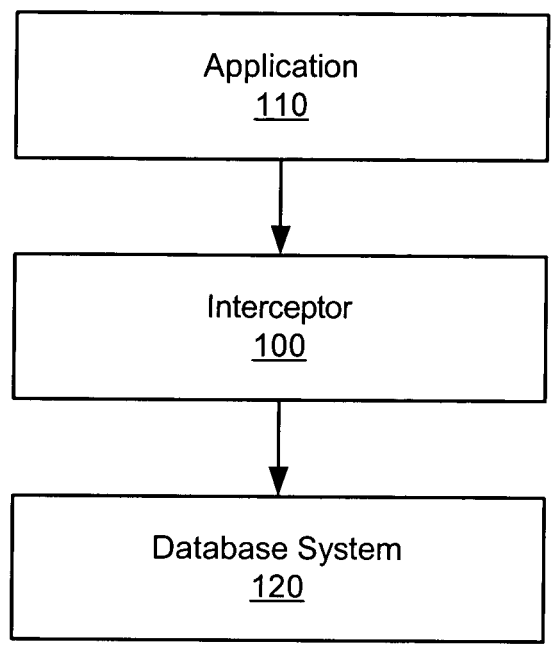
FIG. 1 illustrates an exemplary architecture of the described system according to an embodiment of the invention.

FIG. 1 illustrates an exemplary architecture of the described system according to an embodiment of the invention. An interceptor 100 receives or intercepts database access statements issued by an application 110 and translates the queries, to the extent required, into an appropriate format prior to providing the queries to a database system 120.

Figure 2:
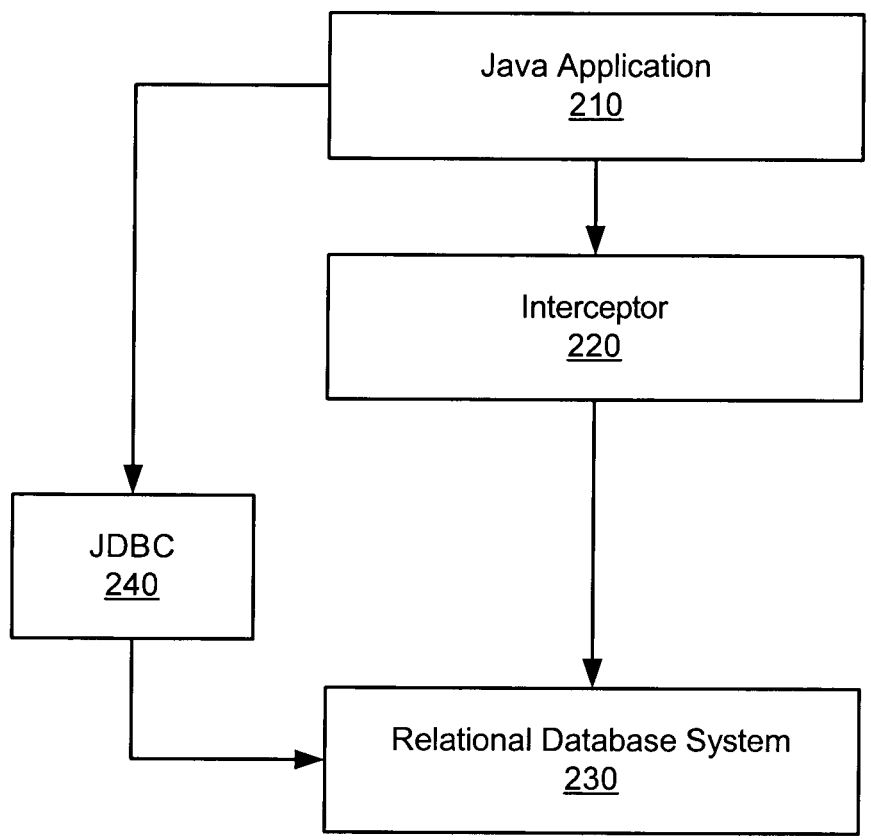
FIG. 2 illustrates another exemplary architecture according to an embodiment of the invention.

FIG. 2 illustrates another exemplary architecture according to an embodiment of the invention. Structured Query Language (SQL) statements issued by a Java application 210 are intercepted by an interceptor 220 and provided to a relational database system (RDBS) 230. The term SQL statement broadly refers to database access statements that are compliant with the American National Standards Institute/International Organization or Standardization (ANSI/ISO) 9075: 1992 Information Technology—Database Languages—SQL standard (SQL-92 Standard) and similar standards. In one embodiment, SQL statements issued by Java application 210 may bypass interceptor 220 and be directly provided to RDBS 230 via a Java Database Connectivity (JDBC) driver 240. The term JDBC driver broadly refers to an Application Program Interface (API) that is bundled with the Java 2 Platform, Standard Edition (J2SE), version 1.4.2, published June 2003.

In alternative embodiments of the invention, other APIs are used to bypass interceptor 220.

Figure 3:
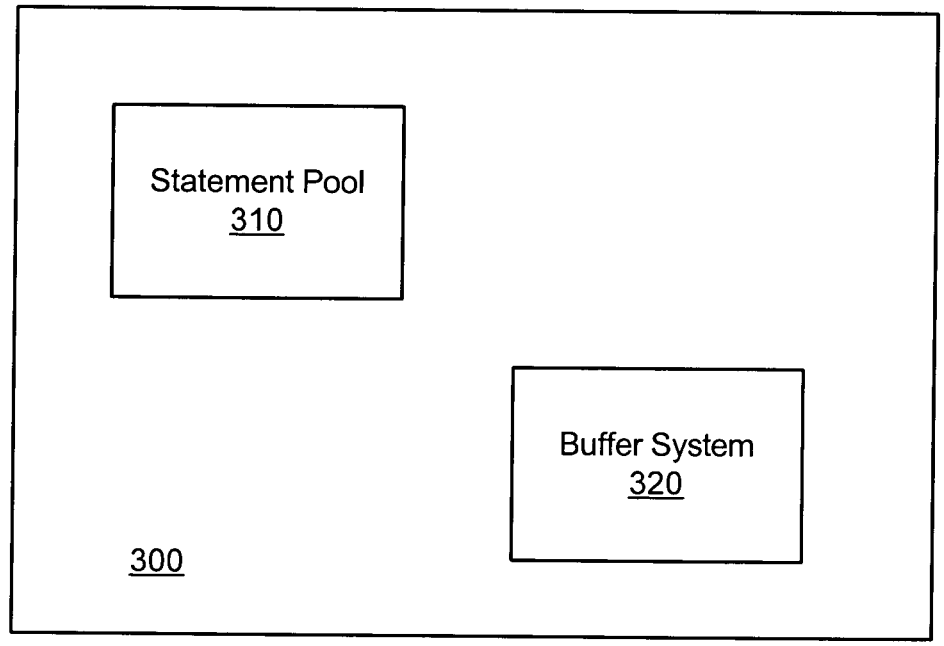
FIG. 3 illustrates selected components of an interceptor, according to an embodiment of the invention.

FIG. 3 illustrates selected components of an interceptor, according to an embodiment of the invention. Interceptor 300 may include statement pool 310 to cache prepared database access statements. A prepared database access statement refers to a database access statement that does not need to be compiled by a database before being processed by the database. Interceptor 300 may also include buffer system 320 to cache selected portions of one or more data sources.

Statement pooling may be used to improve performance by caching executable database access statements (e.g., SQL statements), for example, those that are repeatedly used. The improved performance is particularly important for applications that employ a loop or call a particular method repeatedly. A statement pool may cache frequently used statements that are prepared once and executed multiple times and thereby reduce the overall number of parse calls that are issued against a database. The reuse of a prepared statement may be transparent to the application that submitted that database access statement.

Figure 4:
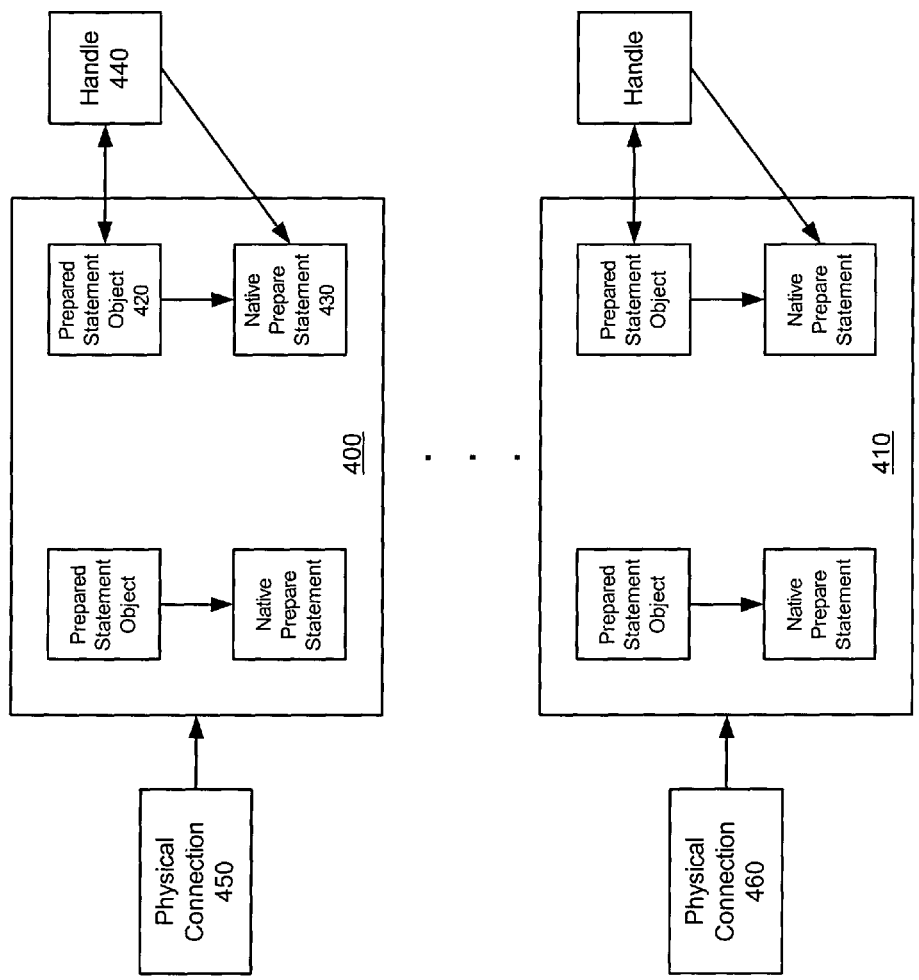
FIG. 4 illustrates statement pool instances, implemented according to an embodiment of the invention.

FIG. 4 illustrates statement pool instances, implemented according to an embodiment of the invention. The illustrated embodiment is described with reference to an object-oriented language (e.g. Java). However, statement pool instances 400 and 410 are not required to be implemented with an object-oriented language. Statement pool instance 400 includes: prepared statement object 420, native prepare statement 430, and handle 440. Statement pool instance 400 is associated with physical connection 450 and statement pool instance 410 is associated with physical connection 460. In an embodiment, each instance of a statement pool is associated with a particular physical connection to a data source (e.g., to a database). In such an embodiment, multiple pool instances can exist if statement pooling is enabled for several physical connections. An instance of a DirectConnection object or a Direct-PooledConnection object, in an embodiment of the invention, may represent physical connections 450 and 460.

In an embodiment in which pooled connections are used, all of the logical connections produced by a pooled connection may share the same statement pool instance. The term "pooled connections" refers to keeping database connections open and ready for re-use rather than creating them (an expensive process) each time the connections are requested. A "logical connection" refers to a database connection established through a pooled connection. A logical connection may be closed while the pooled connections may be returned to the connection pool. In one embodiment, an instance of a statement pool is created each time a physical connection to a data source is created. The capacity of statement pool instance 400 may be specified as a parameter of the constructor method used to create statement pool instance 400. The capacity of a statement pool refers to, for example, the number of prepared statements that may be pooled in the statement pool.

Native prepare statement 430 represents a database access statement submitted by an application (e.g., application 110 shown in FIG. 1) to prepare a give (or prepared) database access statement. Statement pool instance 400 caches prepared statements (e.g., prepared statement object 420) so that, for example, frequently used statements may be prepared once and used repeatedly. Prepared statement object 420 references native prepare statement 430 and may also provide an interface to native prepare statement 430. The use of pooled statement objects (e.g., prepared statement object 420) enables statement pool instance 400 to be independent of the class of objects being represented by the pooled statements objects.

Prepared statement object 420 may be added to statement pool instance 400 in the following sequence of events. Application 110 (shown in FIG. 1) submits a native prepare statement 430 to interceptor 100 (shown in FIG. 1). Interceptor 100 identifies a data source associated with native prepare statement 430 and a statement pool instance (e.g., statement pool instance 400) associated with the identified data source. Statement pool instance 400 is searched to determine whether it contains a matching prepared statement. If statement pool instance 400 does not contain a matching prepared statement, then interceptor 100 provides native prepare statement 430 to the data source where it is prepared. When native prepare statement 430 request is closed, the interceptor creates prepared statement object 420 to reference native prepare statement 430 and adds prepared statement object 420 to statement pool instance 400.

Prepared statement object 420 maintains a copy of the SQL string corresponding to native prepare statement 430. Prepared statement object 420 also maintains a reference to the physical connection (physical connection 450) through which native prepare statement 430 was created. Handle 440 may be created when native prepare statement 430 is reused. Handle 440 is a DirectPreparedStatement object that refers to prepared statement object 420 and native prepare statement 430, in an embodiment of the invention.

If an application submits a database access statement corresponding to physical connection 450, statement pool instance 400 may be automatically searched to determine whether it contains a matching prepared statement. In an embodiment, three criteria determine whether a submitted database access statement matches a pooled statement. First, the SQL string of the submitted statement must match (e.g., be identical to) the SQL string of the pooled statement. Second, the statement type of the submitted statement must match (e.g., be identical to) the statement type of the pooled statement. Finally, the scrollable type of result sets produced by the submitted statement must be the same as for the pooled statement (e.g., forward-only or scrollable). The term "scrollable type" for a result set refers to the ability to move a result set's cursor backward and/or forward. If a matching statement is found in statement pool instance 400, a handle (e.g., handle 440) is created for the matching pooled statement. The logical handle may be returned to the application that submitted the database access statement. The matching pooled prepared statement is initialized and marked as used in an embodiment of the invention. If no matching statement is found, then the database access statement may be passed to the data source, which prepares the statement.

Figure 5:
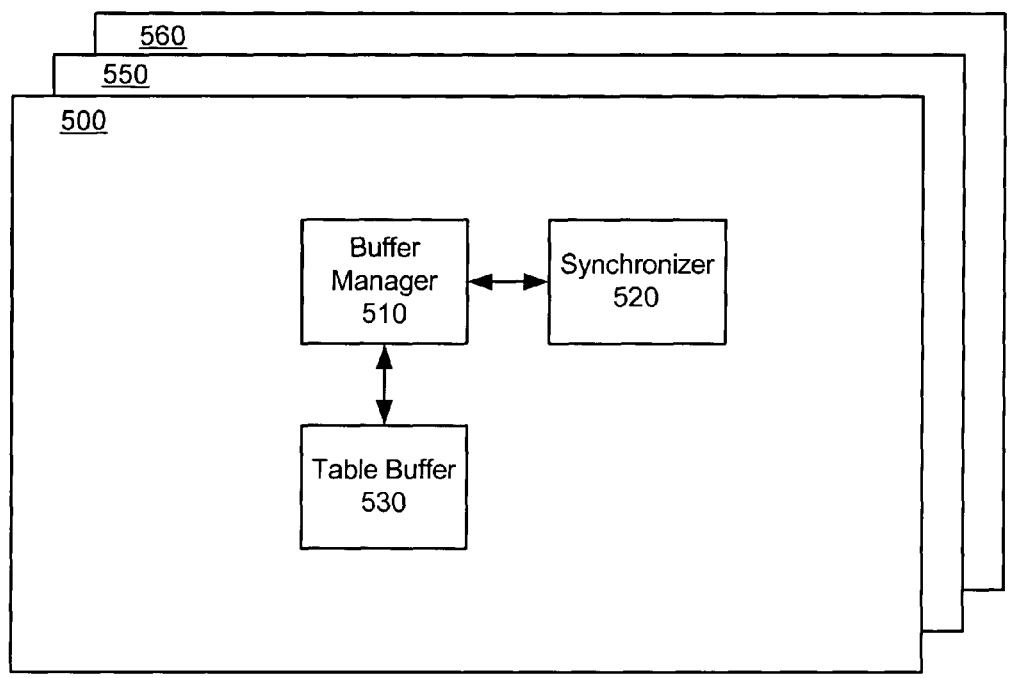
FIG. 5 illustrates selected components of a buffer system, implemented according to an embodiment of the invention.

FIG. 5 illustrates selected components of a buffer system, implemented according to an embodiment of the invention. Data buffering may be used to improve performance by buffering information that is repeatedly used. Buffer system 500 should not be confused with a Database Management System (DBMS) cache. A DBMS cache resides in the central memory area of a database system (e.g., database system 120 shown in FIG. 1) and is managed exclusively by the database system. In contrast, buffer system 500 resides in an interceptor (e.g., interceptor 100, shown in FIG. 1). The connection between an interceptor and a database system is generally implemented over a network. Buffer system 500 can reduce traffic over the network by providing requested data without accessing the database system over the network.

Buffer system 500 includes buffer manager 510, synchronizer 520, and table buffer 530. Buffer manager 510 receives a database access statement and determines whether table buffer 530 contains the requested data. If table buffer 530 contains the requested data, buffer manager 510 may respond to the received database access statement. Otherwise, buffer manager 510 passes the received database access statement to a data source. Buffer manager 510 may also load data into table buffer 530, if table buffer 530 does not contain the requested data. For example, buffer manager 510 may receive requested data from a data source, pass the requested data to an application, and load the data into table buffer 530.

Figure 6:
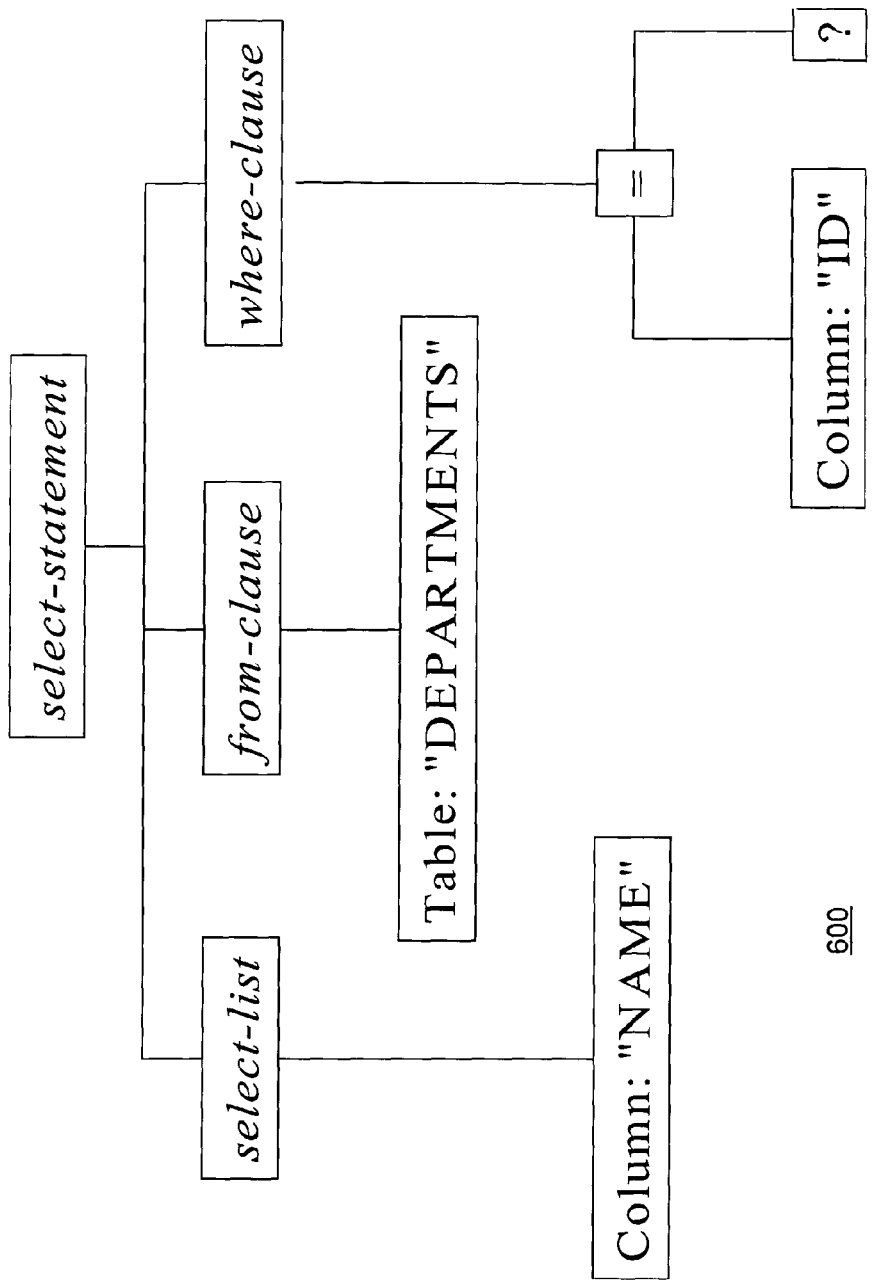
FIG. 6 illustrates a tree representation of a database access statement.

In an embodiment, buffer manager 510 references a tree data structure to determine whether table buffer 530 contains the requested data. FIG. 6 illustrates an exemplary tree data structure 600 representing the database access statement, "SELECT name FROM departments WHERE id=?." Techniques for traversing tree data structures are well known and are not further described. In an embodiment, if buffer manager 510 finds a tree path that represents the received database access statement, then table buffer 530 contains the requested data.

In an embodiment, multiple instances of a table buffer may be simultaneously connected to the same data source. Synchronizer 520 is the local component of a global system (not shown) used to ensure that all instances of the table buffer are buffering valid data. Table buffers 550 and 560 illustrate that a node may maintain multiple table buffers.

Figure 7:
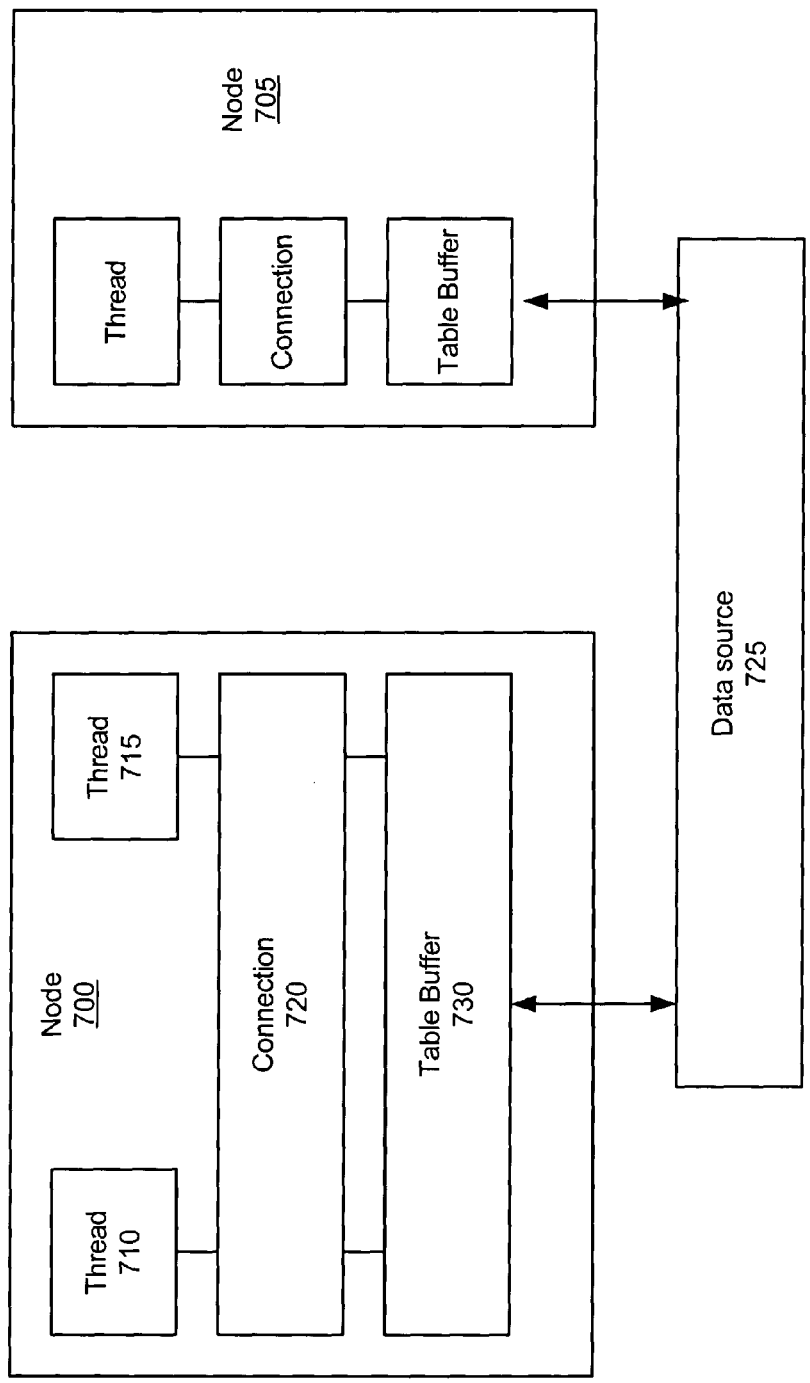
FIG. 7 is a block diagram of two nodes including table buffers implemented according to an embodiment of the invention.

FIG. 7 is a block diagram of two nodes including table buffers implemented according to an embodiment of the invention. Nodes 700 and 705, in an embodiment, are application servers implemented according to the Java 2 Enterprise Edition Specification v1.3, published on Jul. 27, 2001 (the J2EE Standard). In the illustrated embodiment, threads 710 and 715 are executing on node 700. The term thread broadly refers to a program's path of execution.

Thread 710 may establish physical connection 720 to data source 725 with a database access statement. In one embodiment, Node 700 automatically creates table buffer 730, when physical connection 720 is established. In an embodiment, a separate table buffer is created for each physical connection to a data source. Thread 715 may also be connected to data source 725 through physical connection 720. While threads 710 and 715 share the same physical connection to data source 725, they may each have a different logical connection. For additional information regarding physical and logical connections to data sources, see, for example, the J2EE standard.

Figure 8:
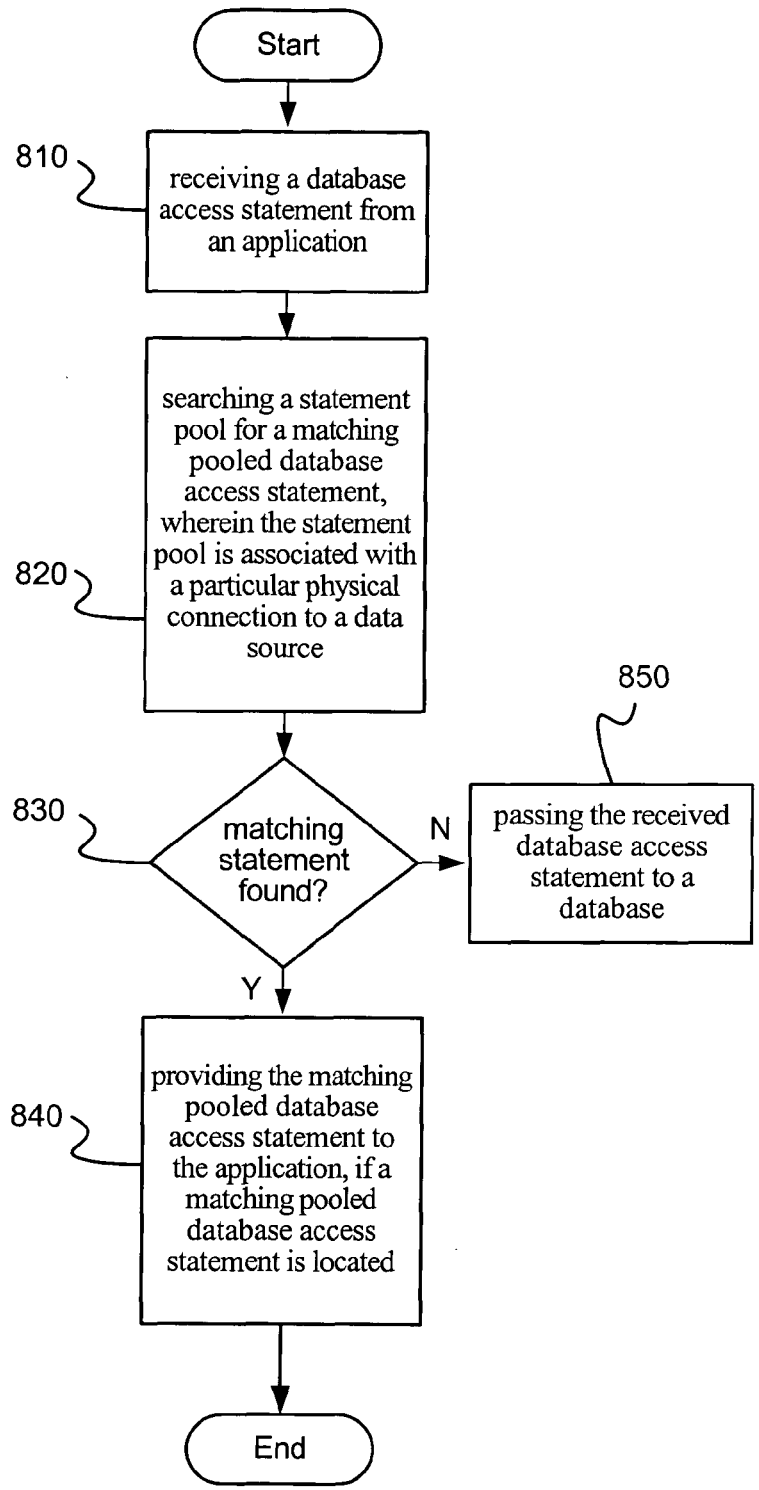
FIG. 8 is a flow diagram illustrating certain aspects of a method for pooling prepared database access statements, according to an embodiment of the invention.
Figure 9:
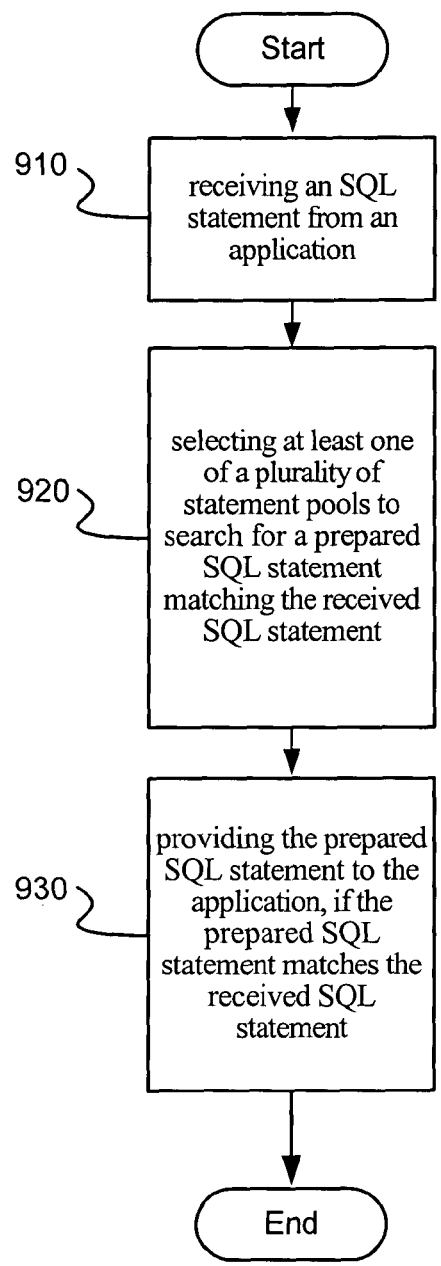
FIG. 9 is a flow diagram illustrating certain aspects of a method for pooling database access statements, according to an embodiment of the invention employing multiple statement pools.
Figure 10:
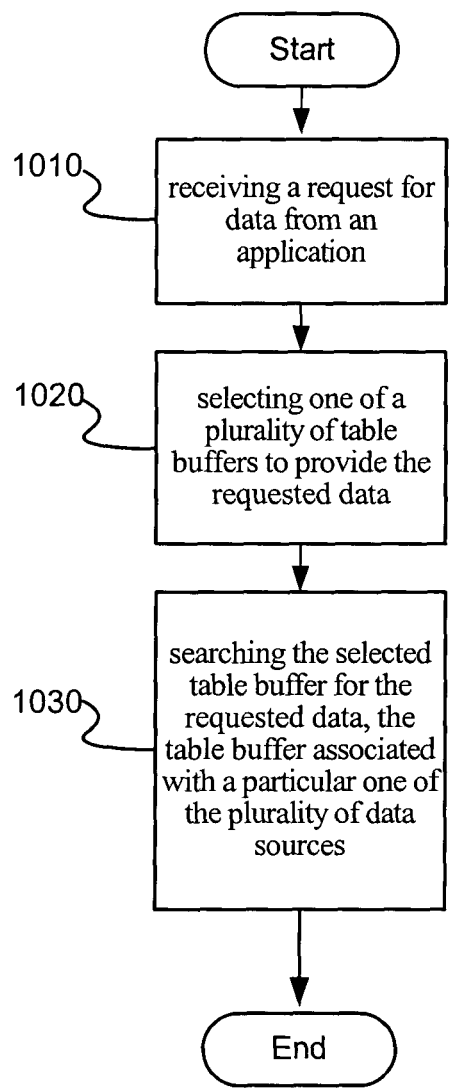
FIG. 10 is a flow diagram illustrating certain aspects of a method for searching table buffers, according to an embodiment of the invention.

Turning now to FIGS. 8-10, the particular methods associated with embodiments of the invention are described in terms of computer software and hardware with reference to a flowchart. The methods to be performed by interceptor 100 may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interfacing to a variety of operating systems. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for pooling prepared database access statements, according to an embodiment of the invention. Referring to process block 810, in an embodiment, an interceptor (e.g., interceptor 100 shown in FIG. 1) receives a database access statement from an application. The received database access statement may be one of a predefined set of portable database access statements. The term "portable database access statements" refers to a set of database access statements that may be executed on any of a number of selected database systems made by different vendors. In an embodiment, the received database statement is a Structured Query Language (SQL) statement. The application providing the database access statement may be a Java application. The term Java application broadly refers to an application developed according to, for example, the Java 2 Platform Standard Edition (J2SE).

Referring to process block 820, the interceptor searches a statement pool for a matching pooled prepared database access statement. In an embodiment, the statement pool is associated with a particular physical connection to a database. The term physical connection broadly refers to a physical database connection established, for example, with a JDBC driver. A JDBC driver may also be used to automatically search the statement pool. In an embodiment, the matching criteria are: the SQL string of the received statement is the same as the SQL string of the pooled SQL statement; the statement type of the received SQL statement is the same as the statement type of the pooled SQL statement; and the scrollable type of result sets produced by the received SQL statement are the same as those of the pooled SQL statement (e.g., forward-only or scrollable). The matching criteria may be different in an alternative embodiment of the invention.

If a matching pooled prepared statement is found, the matching statement is provided to the application at 840. In one embodiment, the matching pooled prepared statement is marked as to prevent simultaneous use of the pooled prepared statement by two or more applications. Alternatively, if no matching pooled prepared statement is found, the received database access statement is provided to the database at 850. In an embodiment, a logical handle corresponding to the pooled prepared database access statement is created and associated with the pooled prepared statement. In such an embodiment, the logical handle may be provided to the application, rather than the pooled prepared statement. In an embodiment of the invention implemented in an object-oriented environment, the logical handle may be a PreparedStatement object.

FIG. 9 is a flow diagram illustrating certain aspects of a method for pooling prepared database access statements, according to an embodiment of the invention employing multiple statement pools. In an embodiment, there is a separate statement pool corresponding to each physical connection to a database. Referring to 910, an interceptor (e.g., interceptor 100 shown in FIG. 1) receives an SQL statement from an application over a given database connection. The interceptor searches the statement pool associated with the connection for a matching pooled prepared statement. The interceptor may parse the received SQL statement to determine, for example, from a wrapper surrounding the SQL statement, which statement pool to search. If the selected statement pool contains a matching SQL statement, that statement is provided to the application at 930.

FIG. 10 is a flow diagram illustrating certain aspects of a method for searching table buffers, according to an embodiment of the invention. Referring to 1010, an interceptor receives a request for data from an application. The received request may be a database access statement (e.g., an SQL statement). In such an embodiment, the received database access statement may be one of a predefined set of portable database access statement.

The interceptor selects one of a plurality of table buffers to provide the requested data at 1020. In an embodiment, the selection is based, at least in part, on the received request for data. For example, the interceptor may parse the received request to obtain an identifier for a particular database associated with the received request. The node may match the obtained identifier to one of the plurality of table buffers. The matching table buffer may then be selected to provide the requested data. The matching table buffer is searched for the requested data at 1030. In an embodiment, the matching table buffer is associated with a particular one of the plurality of data sources.

Figure 11:
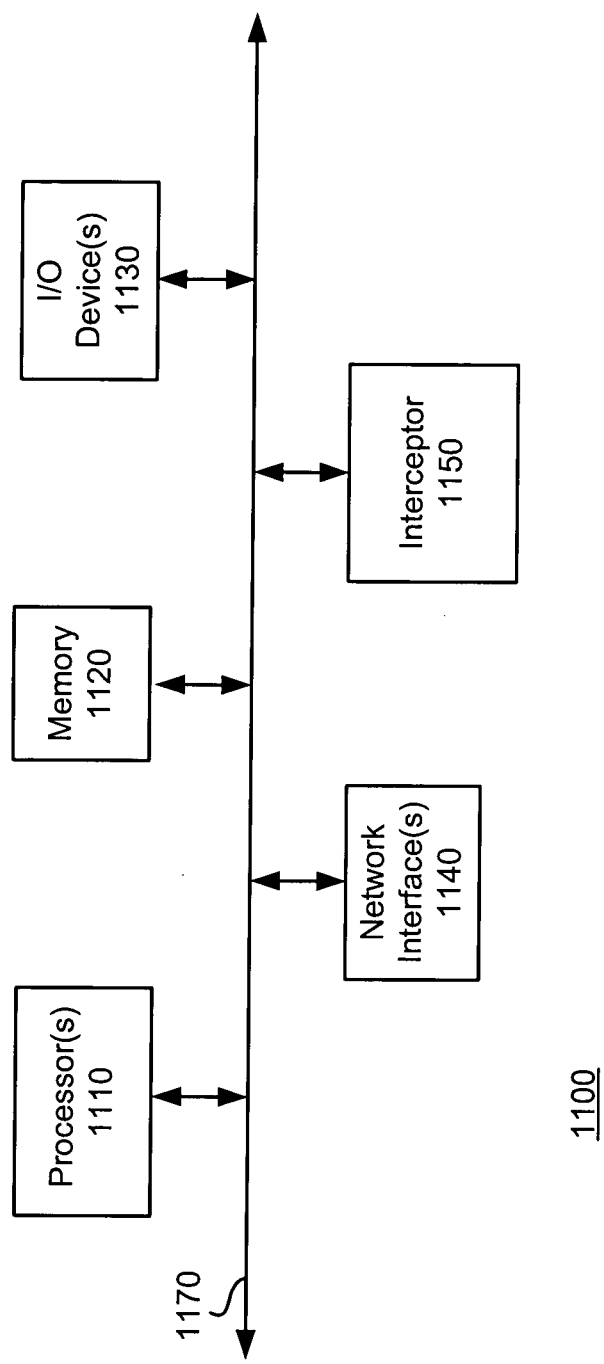
FIG. 11 is a block diagram of a node implemented according to an embodiment of the invention.

FIG. 11 is a block diagram of node 1100 implemented according to an embodiment of the invention. Node 1100 may include: one or more processor(s) 1110, memory 1120, one or more Input/Output interfaces 1130, network interface(s) 1140, and interceptor 1150. The illustrated elements may be connected together through system interconnect 1170. One or more processors 1110 may include a microprocessor, microcontroller, field programmable gate array (FPGA), application specific integrated circuit (ASIC), central processing unit (CPU), programmable logic device (PLD), and similar devices that access instructions from system storage (e.g., memory 1120), decode them, and execute those instructions by performing arithmetic and logical operations.

Interceptor 1150 enables node 1100 to intercept database access statements that are issued by an application before they reach a database. Interceptor 1150 may be executable content, control logic (e.g., ASIC, PLD, FPGA, etc.), firmware, or some combination thereof, in an embodiment of the invention. In embodiments of the invention in which interceptor 1150 is executable content, it may be stored in memory 1120 and executed by control processor 1110.

Memory 1120 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1120 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1120 may store program modules such as routines, programs, objects, images, data structures, program data, and other program modules that perform particular tasks or implement particular abstract data types that facilitate system use.

One or more I/O interfaces 1130 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 1170 permits communication between the various elements of node 1100. System interconnect 1170 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
   receiving a first database query from an application, the first database query to access information in a database;
   based on the first database query, determining a second database query, the second database query being a compiled version of the first database query, the second database query stored in a query pool of compiled database queries, the query pool associated with a physical connection to the database, wherein the second database query is determined based on at least a scrollable type of result set to be generated by the first database query being similar to a scrollable type of result set to be generated by the second database query; and
   causing the information in the database to be accessed based on the second database query and not based on compiling the first database query.

2. The method of claim 1, wherein causing the information in the database to be accessed based on the second database query comprises:
   determining a logical handle for the second database query; and
   causing the information in the database to be accessed based on the logical handle for the second database query.

3. The method of claim 1, further comprising:
   searching the query pool with a Java Database Connectivity (JDBC) driver.

4. The method of claim 1, wherein there are multiple instances of the query pool.

5. The method of claim 1, wherein the first database query is a Structured Query Language (SQL) statement.

6. The method of claim 5, wherein determining the second database query based on the first database query comprises:
   searching in the query pool for the second database query based on the first database query.

7. The method of claim 6, further comprising:
   determining whether a statement type of the first database query matches a statement type of the second database query.

8. The method of claim 1, further comprising:
receiving from the application a third database query to access information in the database;
based on a compiled version of the third database query not being located in the query pool, causing a compiled version of the third database query to be generated and to be stored in the query pool.

9. The method of claim 8, further comprising:
causing the compiled version of the third database query to be used to access the information in the database; and
storing the compiled version of the third database query in the query pool.

10. An article of manufacture comprising:
an electronically accessible medium providing instructions that, when executed by an apparatus, cause the apparatus to perform an operation comprising:
receiving a first database query from an application, the first database query to access information in a database;
based on the first database query, determining whether a second database query exists in a query pool of compiled database queries, the second database query being a compiled version of the first database query, the query pool associated with a physical connection to the database;
based on the second database query existing in the query pool, causing the second database query to be used to access the information in the database instead of having to compile the first database query, wherein the second database query is determined based on at least a scrollable type of result sets to be generated by the first database query being similar to a scrollable type of result set to be generated by the second database query; and
based on the second database query not existing in the query pool, causing the first database query to be compiled and used to access the information in the database.

11. A system comprising:
means for receiving from an application a database access statement requesting an access to a database;
means for searching a statement pool for a prepared database access statement corresponding to the received database access statement, the statement pool including compiled database access statements and associated with a physical connection in a plurality of physical connections to the database, and the prepared database access statement being a compiled version of the received database access statement;
means for causing the information in the database to be accessed using the prepared database access statement based on the prepared database access statement being found in the statement pool and based on at least a scrollable type of result sets to be generated by the received database access statement being similar to a scrollable result set to be generated by the prepared database access statement; and
means for causing a compiled version of the received database access statement to be generated based on the prepared database access statement not being found in the statement pool, the compiled version of the received database access statement to be stored in the statement pool.

12. A method comprising:
receiving from an application a Structured Query Language (SQL) statement requesting an access to a database;
selecting at least one of a plurality of statement pools to search for a prepared SQL statement corresponding to the received SQL statement, the prepared SQL statement to request the access to the database, wherein each statement pool in the plurality of statement pools is associated with a physical connection in a plurality of pooled physical connections to the database;
searching the selected statement pool for the prepared SQL statement corresponding to the received SQL statement, the selected statement pool including compiled SQL statements, the prepared SQL statement being equivalent to a compiled version of the received SQL statement; and
based on locating the prepared SQL statement corresponding to the received SQL statement in the selected statement pool and based on at least a statement type of the received SQL statement being similar to a statement type of the prepared SQL statement, providing to the application the prepared SQL statement or a logical handle for the prepared SQL statement.

13. The method of claim 12, wherein selecting at least one of the plurality of statement pools comprises:
parsing the received SQL statement to determine which one of the plurality of statement pools to search.

* * * * *